United States Patent
Kim (12) 
(10) Patent No.: US 6,337,659 B1
(45) Date of Patent: Jan. 8, 2002

(54) PHASED ARRAY BASE STATION ANTENNA SYSTEM HAVING DISTRIBUTED LOW POWER AMPLIFIERS

(75) Inventor: Sang-Gi Kim, Suwon (KR)

(73) Assignee: Gamma Nu, Inc., Suwon (KR)

( * ) Notice: Subject to any disclaimer, the term of this patent is extended or adjusted under 35 U.S.C. 154(b) by 0 days.

(21) Appl. No.: 09/426,198

(22) Filed: Oct. 25, 1999

(51) Int. Cl.⁷ .................................................. H01Q 3/26
(52) U.S. Cl. ...................................... 342/373; 342/374
(58) Field of Search .............................. 342/194, 157, 342/354, 373, 374; 455/154.2, 341

(56) References Cited

U.S. PATENT DOCUMENTS

| | | | |
|---|---|---|---|
| 3,706,094 A | * 12/1972 | Cole et al. ............... | 343/6.5 SS |
| 4,472,719 A | 9/1984 | Hills | |
| 4,595,926 A | * 6/1986 | Kobus et al. ................ | 343/368 |
| 4,736,463 A | 4/1988 | Chavez | |
| 5,115,248 A | 5/1992 | Roederer | |
| 5,633,873 A | * 5/1997 | Kay et al. .................... | 370/336 |
| 5,659,322 A | * 8/1997 | Caille .......................... | 342/188 |
| 5,831,582 A | 11/1998 | Muhlhauser et al. | |
| 6,016,123 A | * 1/2000 | Barton et al. ................ | 342/373 |

FOREIGN PATENT DOCUMENTS

| | | |
|---|---|---|
| WO | 98/39856 | 9/1998 |
| WO | 99/52181 | 10/1999 |

OTHER PUBLICATIONS

"Electronic Beam Tilting of Base Station Antenna: Rotman Lens Fed," by S.G. Kim, et al., that appeared at pp. 95–98 in RAWCON 98, Proceedings, 1998 IEEE Radio and Wireless Conference, Colorado Springs, Colorado, USA.

* cited by examiner

*Primary Examiner*—Dao Phan
(74) *Attorney, Agent, or Firm*—Greenblum & Bernstein, P.L.C.

(57) ABSTRACT

A phased array antenna system having low power amplifiers reduces power loss through several tens meters high frequency cables. The antenna system for transmitting a signal in a base station, comprising: a phased array unit for selecting an input signal through one of a plurality of beam ports, for dividing the input signal into a plurality of signals and for outputting the plurality of signals through a plurality of array ports, each of the signal having a linear phase difference according to difference of propagation path; a switch for receiving the input signal from a base station, for selecting one of the plurality of beam ports of said phased array and for transmitting the input signal to the selected beam port, responsive to a control signal transmitted from the base station; a plurality of low power amplifiers for low power amplifying the plurality of signals inputted from the plurality of array ports of said phased array; and phased array antennas for radiating the plurality of signals from said plurality of low power amplifiers, thereby providing a spatial power summation into a direction of equiphase plane allowing effective radiated power sufficiently enough to cover a cell into a steered direction selected by said switch.

10 Claims, 7 Drawing Sheets

MECHANICAL BEAM CONTROL

PHASED ARRAY BASE STATION ANTENNA SYSTEM HAVING DISTRIBUTED LOW POWER AMPLIFIERS

BACKGROUND OF THE INVENTION

1. Field of the Invention

The present invention relates to an antenna system, more particularly to an enhanced phased array base station antenna system having distributed low power amplifiers for mobile and wireless communication such as digital cellular communication, personal communication service (PCS), wireless local loop, local point multi distribution system and trunk radio service.

2. Prior Art of the Invention

In order to provide a wireless service, a base station antenna system transmits radio frequency signal through a transmitting antenna to a mobile station and receives signals radiated from a mobile station. From the advents of the aforementioned cellular mobile communications, there have been various kinds of efforts for cost-saving and improving service quality through the base station antenna system.

Figure 1A:
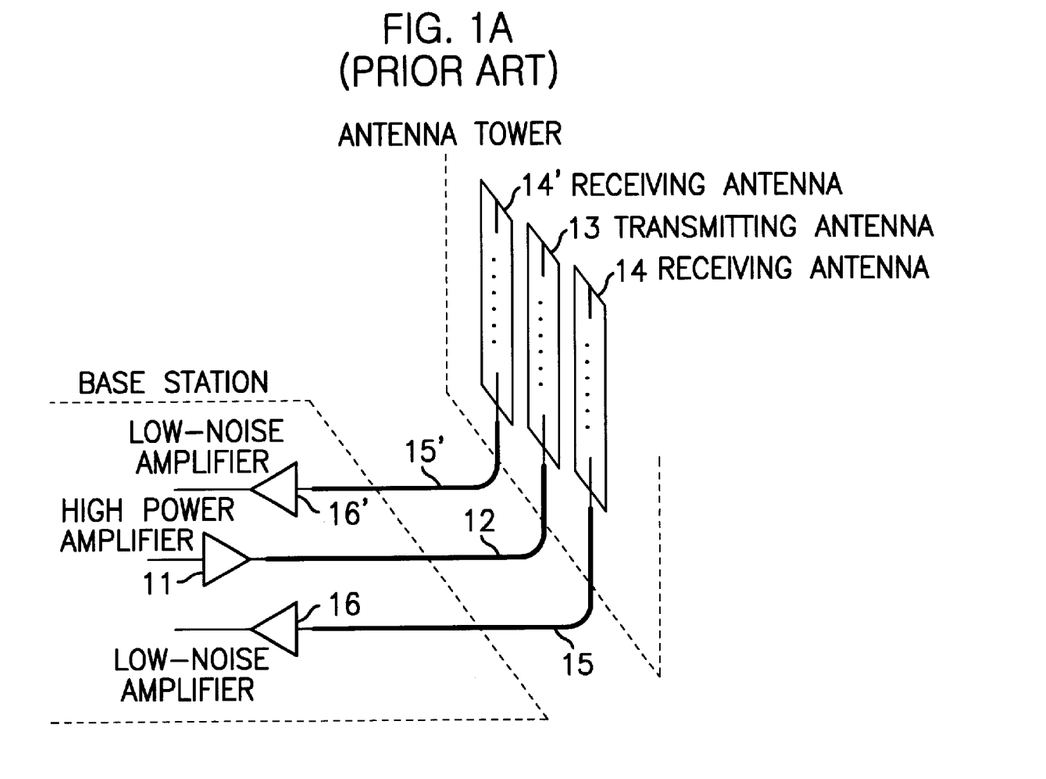
FIGS. 1A and 1B are diagrams illustrating a conventional space diversity base station antenna system.
Figure 1B:
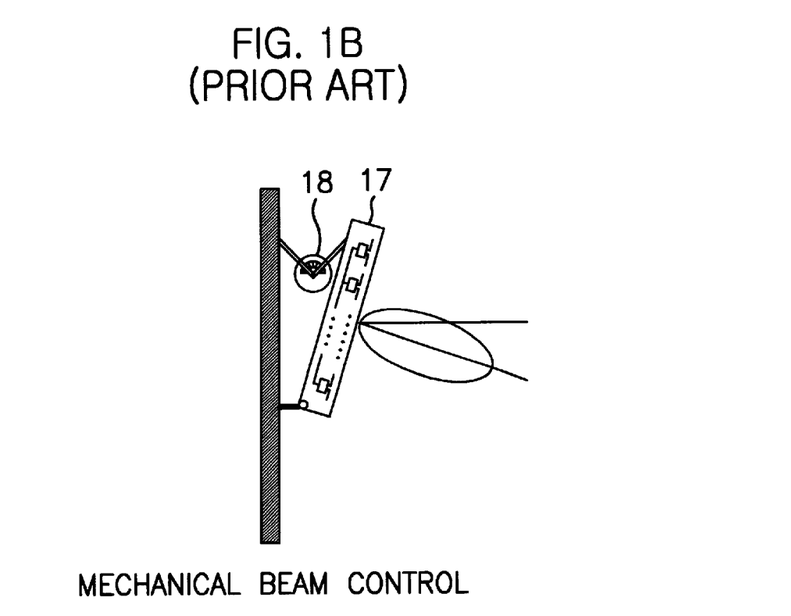

FIGS. 1A and 1B show a conventional antenna system for a base station in accordance with the prior art.

The antenna system comprises a transmitting antenna 13, a receiving antenna 14, a transmitting or receiving antenna 17 and a bracket 18. The base station comprises a high power amplifier 11 and a low noise amplifier 16. The antenna system is coupled to the base station through radio frequency cables 12 and 15.

Referring to FIGS. 1A and 1B, in a forward direction from the base station to the mobile station, a signal to be transmitted is amplified by the high power amplifier 11 in the base station, sent to the transmitting antenna 13 placed on an antenna tower through the radio frequency cable 12 and radiated through the transmitting antenna 13.

In a reverse direction, a radio frequency signal radiated from the mobile station is received by the receiving antenna 14 and sent to the low noise amplifier 16 located inside of the base station through the radio frequency cable 15. Since the reverse direction signals are easily corrupted by the multi-path propagation environments (refers to 'fading'), an additional reverse direction path from receiving antenna 14' to low noise amplifier 16' is needed to cope with fading phenomena. This technique is called as space diversity.

Figure 2:
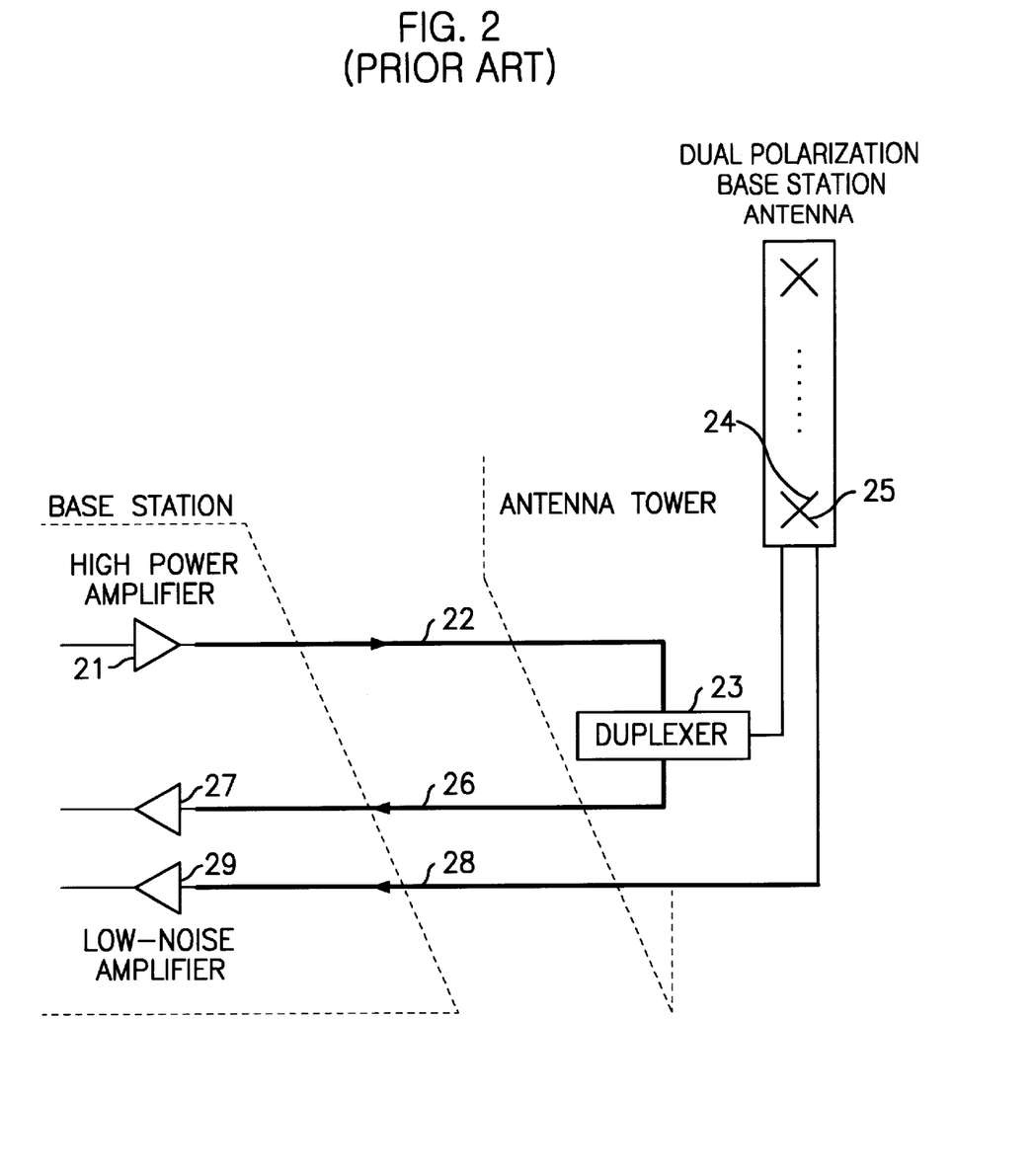
FIG. 2 is a diagram illustrating a conventional polarization diversity base station antenna system.

FIG. 2 is a block diagram illustrating a conventional dual polarized antenna system.

The dual polarized antenna system comprises a duplexer 23 and a transmitting and receiving antenna 24 and a receiving antenna 25. The base station comprises a high power amplifier 21 and low noise amplifiers 27 and 29. The dual polarized antenna system is coupled to the base station through radio frequency cables 22, 26 and 28.

Referring to FIG. 2, in a forward direction, a signal to be transmitted is amplified by the high power amplifier 21 in the base station, sent to the transmitting and receiving antenna 24 placed on an antenna tower through the radio frequency cable 22 and the duplexer 23 and radiated through the transmitting antenna 24.

In a reverse direction, a radio frequency signal radiated from the mobile station is received by the receiving antennas 24 and 25 sent to the low noise amplifier 27 and 29 located inside of the base station through the radio frequency cables 26 and 28. This technique gives an alternative reverse direction path that is necessary to cope with fading. This technique is called as polarization diversity.

In the prior art, the radio frequency cable 12, 15, 22, 26 or 28 usually runs several tens meters from the huge antenna tower to the inside of the base station. The long radio frequency cable unnecessarily consumes more than a half (3 dB) of the transmission power. To keep field intensity necessary to the mobile station in a cell, an amplifier in a forward path should output a higher power than that necessary to compensate loss within the cables. However, as output of the power amplifier becomes higher, the amplifier becomes more expensive and larger. Also, the efficiency of the amplifier becomes worse. As the efficiency of the amplifier is low, unnecessary power dissipated as heat is increased, and thereby there needs a cooling fan or air conditioner in order to balance the heat, which causes noise pollution and additional prime power consumption.

The life span of the high power amplifier with low efficiency is short. Also, if the amplifier goes wrong, communication service is severely deteriorated and even absolutely interrupted. During the service, one can often find those kinds of service interruption. In order to avoid this, one usually needs a dummy high power amplifier additionally.

In the prior antenna system, power loss due to several tens meter radio frequency cable decreases receiving sensitivity or signal to noise ratio in a reverse path from the mobile station to the base station as well as in a forward path. Accordingly, it becomes a main reason to need an excessively specified low noise amplifier in the noise figure and gain for preventing the communication quality from being degraded, thereby the system's cost increasing.

On the other hand, in the cellular communication service such as CDMA (Code Division Multiple Access) or GSM (Global System for Mobile communication) service, if a signal radiated from a base station may be spilled over into the adjacent cell, which acts as an interference to subscribers there. The interference signal deteriorates communication quality. In this case, there needs down-tilt of the base station antenna. However, if an antenna is too much down-tilted, the coverage of the cell may be too small and the antenna pattern may be distorted in the broadside region within the cell. On the contrary, the base station antenna located on the hilly region needs to be up-tilted. Likewise, the tilt control is frequently required in the optimization of the air interface network.

In the prior art, when tilt control is required, a crew rents a crane and climbs up to the antenna tower and turns the mechanical bracket 18 to adjust the tilt angle and checks again. It is very cumbersome as well as expensive. Furthermore, it may cause an unexpected accident in a rainy or snowy day. On the whole, the mechanical down-tilt control in a prior art has been a burdensome problem preventing the optimization of the air interface network in most of the cellular communications.

SUMMARY OF THE INVENTION

Therefore, an object of the present invention is to provide an enhanced base station antenna system reducing power consumption in forward direction.

Another object of the present invention is to provide an enhanced base station antenna system providing higher reliability in forward direction.

Further another object of the present invention is to provide an enhanced base station antenna system improving communication quality in reverse direction.

Still another object of the present invention is to provide a polarization diversity phased array base station antenna system which gives reduction of power consumption and high reliability in forward direction and improves communication quality in reverse direction.

Still another object of the present invention is to provide a cost-saving base station antenna system.

In accordance with an aspect of the invention, there is provided an antenna system for radiating a signal in a base station, comprising: a phased array means for selecting an input signal through one of a plurality of beam ports, for dividing the input signal into a plurality of signals and for outputting the plurality of signals through a plurality of array ports, each of the signal having a linear phase difference according to difference of propagation path; a switching means for receiving the input signal from a base station, for selecting one of the plurality of beam ports of said phased array means and for transmitting the input signal to the selected beam port, responsive to a control signal transmitted from the base station; a plurality of low power amplifying means for low power amplifying the plurality of signals inputted from the plurality of array ports of said phased array means; and phased array radiating means for radiating the plurality of signals from said plurality of low power amplifying means, thereby providing a spatial power summation into a direction of equiphase plane allowing effective radiated power sufficiently enough to cover a cell into a steered direction selected by said beam switching means.

In accordance with another aspect of the invention, there is provided an antenna system for receiving a signal in a base station, comprising: a phased array receiving means for allowing a signal radiated from a mobile station; a phased array means for receiving a plurality of signals from said phased array receiving means through a plurality of array ports, each signal having a linear phase difference, and for allowing the plurality of signals to be in-phased and strengthened at a beam port; a switching means for selecting the strengthened signal responsive to a control signal transmitted from the base station; and a low noise amplifying means for low noise amplifying a selected signal and transmitting the selected signal down to the base station.

In accordance with further another aspect of the invention, there is provided a polarization diversity phased array base station antenna system, comprising: a transmitting phased array means for selecting an input signal through one of a plurality of beam ports, for dividing the input signal into a plurality of signals and for outputting the plurality of signals through a plurality of array ports, each of the signal having a linear phase difference according to difference of propagation path length; a first switching means for receiving the input signal from a base station, for selecting one of the plurality of beam ports of said phased array means and for transmitting the input signal to the selected beam port, responsive to a control signal transmitted from the base station; a first plurality of low power amplifying means for low power amplifying the plurality of signals inputted from the plurality of array ports of said phased array means; a first phased array antennas for radiating the plurality of signals from said plurality of low power amplifying means, thereby providing a spatial power summation into a direction of equiphase plane allowing effective radiated power sufficiently enough to cover a cell into a steered direction selected by said beam switching means, and for receiving a signal radiated from a mobile station; duplexing means for transferring signals from said first plurality of low power amplifying means to said a first phased array antennas and for receiving and outputting the received signals from said a first phased array antennas; a second phased array means for receiving a plurality of signals from said duplexing means through a plurality of array ports, each signal having a linear phase difference, and for allowing the plurality of signals to be in-phase and strengthened at a beam port; a second switching means for selecting the strengthened signal responsive to the control signal transmitted from the base station; a first low noise amplifying means for low noise amplifying a selected signal and transmitting the selected signal the base station; a second phased array antennas for receiving a signal radiated from a mobile station; a third phased array means for receiving a plurality of signals from said second phased array antennas through a plurality of array ports, each signal having a linear phase difference, and for allowing the plurality of signals to be in phase and strengthened at a beam port; a third switching means for selecting the strengthened signal responsive to the control signal transmitted from the base station; and a second low noise amplifying means for low noise amplifying a selected signal and transmitting the selected signal the base station.

BRIEF DESCRIPTION OF THE DRAWINGS

Other object and aspects of the invention will become more apparent from the following description of the embodiments with reference to the accompanying drawings in which.

DETAILED DESCRIPTION OF THE INVENTION

Figure 3:
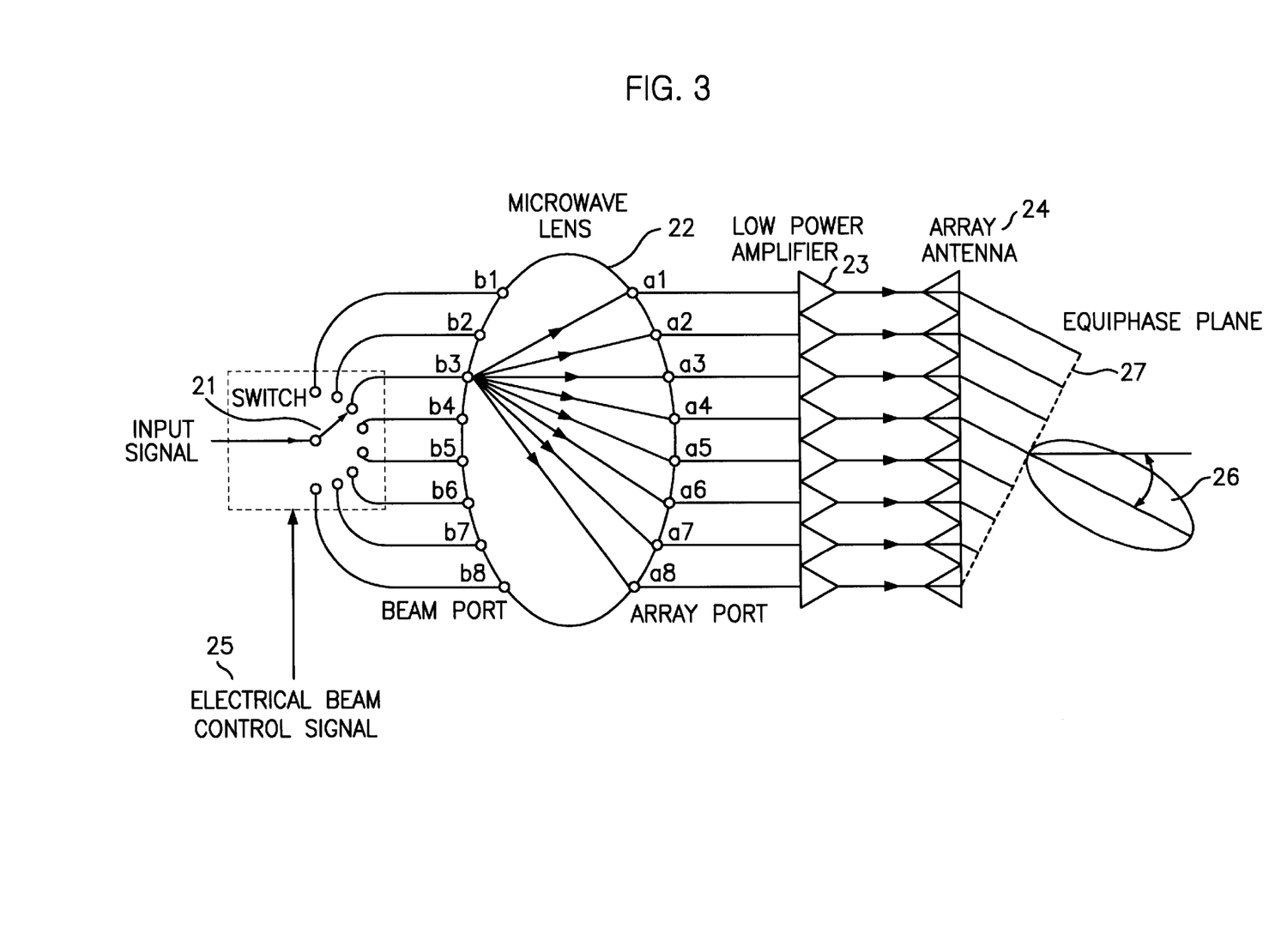
FIG. 3 is a schematic diagram illustrating a transmitting phased array base station antenna system with a set of distributed low power amplifiers in accordance with the present invention.

Referring to FIG. 3, there is a phased array transmitting antenna system having a set of distributed low power amplifiers in accordance with the present invention. The antenna system is based on the active phased array method by using a high-resolution beam-steering microwave lens. The antenna system comprises a microwave switch 21, a microwave lens 22, a plurality of low power amplifiers 23 and arrayed antenna elements 24 spaced at half wavelength at center frequency. The phased array antenna system having low power amplifiers is mounted on an antenna tower.

One of eight beam ports of the microwave lens 22 is selected by the microwave switch 21 responsive to a digital electrical beam-tilt control signal transmitted from an interface card (not shown) in the base station. An operator placing on a remote cell cite can call the interface card to designate the beam port numbers through wireless modem and check the desired beam tilt change. In this embodiment, for only description, it is assumed that a third beam b3 is selected and the control signal is 3-bit signal.

If the beam port b3 is selected, an input signal at the beam port b3 is dispersed to eight array ports a1 to a8 through the high-resolution beam-steering microwave lens 22. The dispersed signals are amplified by the eight low power amplifiers 23, fed to the arrayed antenna elements 24 and radiated into the air. The microwave lens is designed that each beam gives linear path length differences. An equiphase plane 27 depicted as a dashed line in FIG. 2 is formed across the linearly arrayed antennas. It gives almost loss-free spatial power summation of the distributed amplified signals into the direction of normal to the equiphase plane.

Effective radiated output power (ERP) from this spatial power summation is the output P of the power amplifier 23 multiplied by the gain G of the radiating antenna element 24 and by the square of the number of array N, as expressed in equation (1).

$$ERP=PGN^2 \qquad (1)$$

On the contrary, the conventional antenna system using a single high power amplifier having output power P and a high directive antenna having gain G can not avoid the loss L due to the long feed cable, hence, the effective radiated output power is expressed as in equation (2).

$$ERP=PGL \qquad (2)$$

In today's technology, efficiency of low power linear amplifier having output power 2W may go up to 25%. For an illustration, assuming that eight 2W output power (P=2W=33dBm) amplifiers are arrayed (N=8) with antenna element gain of 8dBi (G=8dBi), we obtain the effective radiated power 59dBmi(~800W) from the equation (1). Here, one can calculate the heat dissipation of 48W.

However, in case that conventional base station antenna system requires the same ERP of 59dBmi with the nominal transmitting antenna gain of 17dBi, as can be appreciated from the equation (2), the high power output P=45dBm= 32W is needed. The efficiency is less than 10% because of severe linearity requirements. If 7% is assumed, one may calculate the heat dissipation as about 425W. Here, the loss due to feed cable was assumed roughly 3dB. However, the loss actually is more than 3dB. Because loss increases as frequency is higher and feed cable is longer.

Heat dissipation in accordance with the presented phased array base station antenna is reduced as 1/10 compared with that by the conventional base station antenna system.

With the equation (1), an ordinary person skilled in the art can easily find a distributed low power amplifiers' output power P, radiating element gain G, the number of array needed to replace high power amplifier and a feed loss in (2) in order to obtain the same or more effective radiated power.

Even though the microwave lens is used in this embodiment, other devices for forming multiple beam such as Butler matrix and solid state phase shifters can be used.

Figure 4:
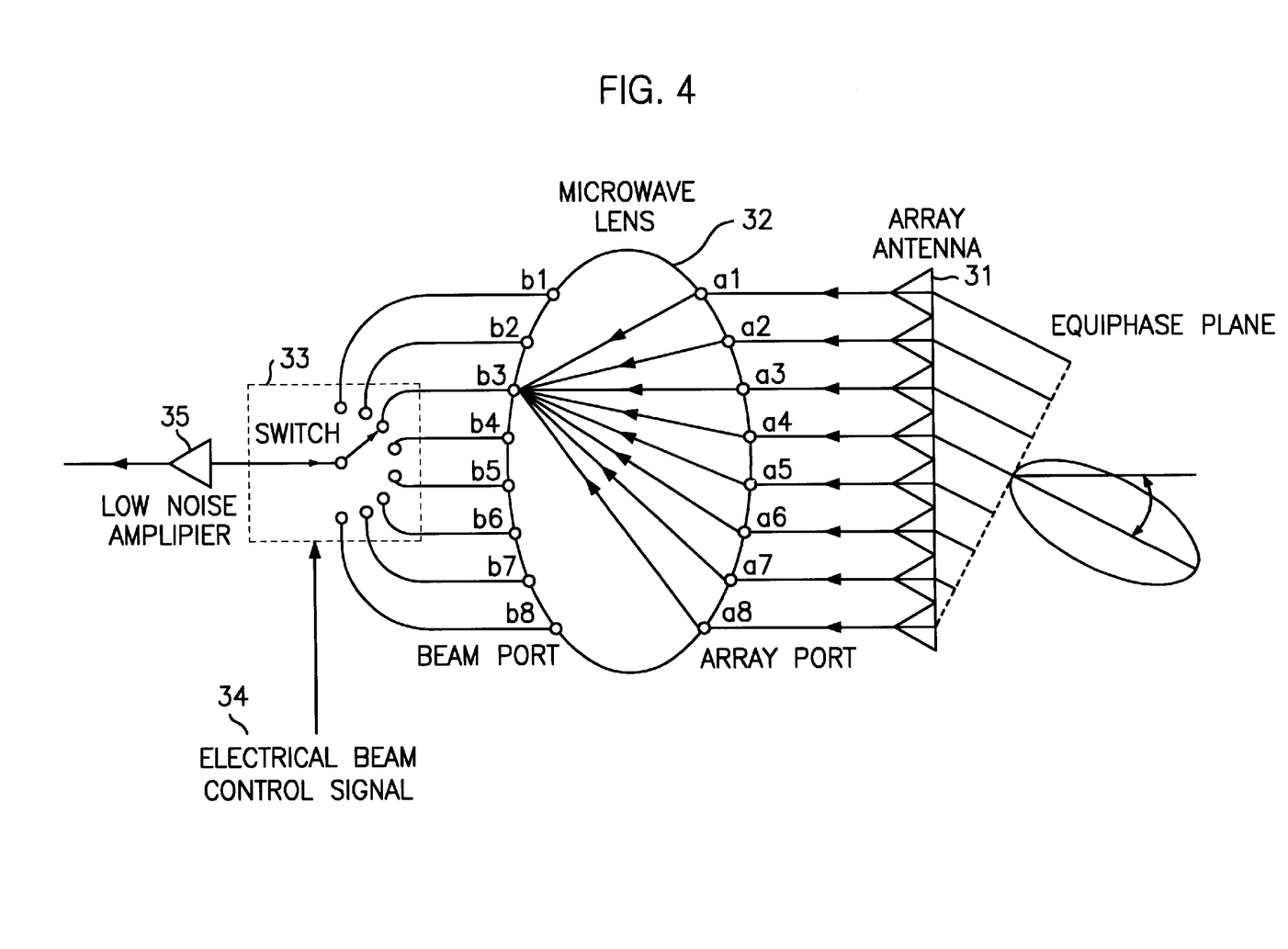
FIG. 4 is a schematic diagram illustrating a receiving phased array base station antenna system having a set of distributed low power amplifiers in accordance with the present invention.

FIG. 4 is a schematic diagram illustrating a receiving antenna system with a low power amplifier in accordance with the present invention. The receiving antenna system comprises a plurality of arrayed antennas 31, a microwave lens 32, a microwave switch 33 and a low noise amplifier 35.

A signal received by the array antennas 31 has linear spatial propagation path length difference across the linearly arrayed antennas 31, propagated through the microwave lens, strengthened at an in-phased beam port and sent to the low noise amplifier. However, the noise signals received by the arrayed antennas are randomly phased and not strengthened at any other beam ports. Accordingly, the antenna system in accordance with the present invention has better receiving sensitivity than that of the conventional antenna system. If the antenna system in accordance with the present invention is utilized, a subscriber can avoid degradation of communication quality due to the feed cable loss. Herein, if the microwave switch 33 receives a command as the same as that for microwave switch 21 for the transmitting antenna system in FIG. 3, the receiving antenna array have the same radiation coverage as that of the transmitting antenna array in FIG. 3.

Each radio signal radiated from a mobile station and received by the plurality of the array antennas 31 has a different phase according to receiving direction of the signal. In other words, there are phase differences among the signals received by the array antennas 31 based on the receiving direction of the signal.

Eight signals, which have a different phase from each other, are inputted to eight array ports of the high-resolution beam-steering lens 32, become to have an identical phase by differences among propagation paths of the lens 32 and are combined at a beam port b3. On the other hands, since phase of noise received along with the received signal is random, the noise is not combined at any beam ports of the microwave lens 32.

One b3 of the beam ports b1 to b8 is selected by the switch 33 being responsive to an electrical beam control signal 34 transmitted from an operator located in a remote area within a cell through wire or wireless path. The control signal consists of 3 bits. Then, the signal combined at the beam port is amplified with improved signal to noise ratio by the low noise amplifier 35 and transmitted to the receiver of the base station. Since the signal is low noise amplified prior to the lossy several tens meter feed cable, the communication quality in the reverse direction is improved.

Even though the microwave lens is used in this embodiment, other devices for forming multiple beam such as Butler matrix and solid state phase shifters can be used.

Figure 5:
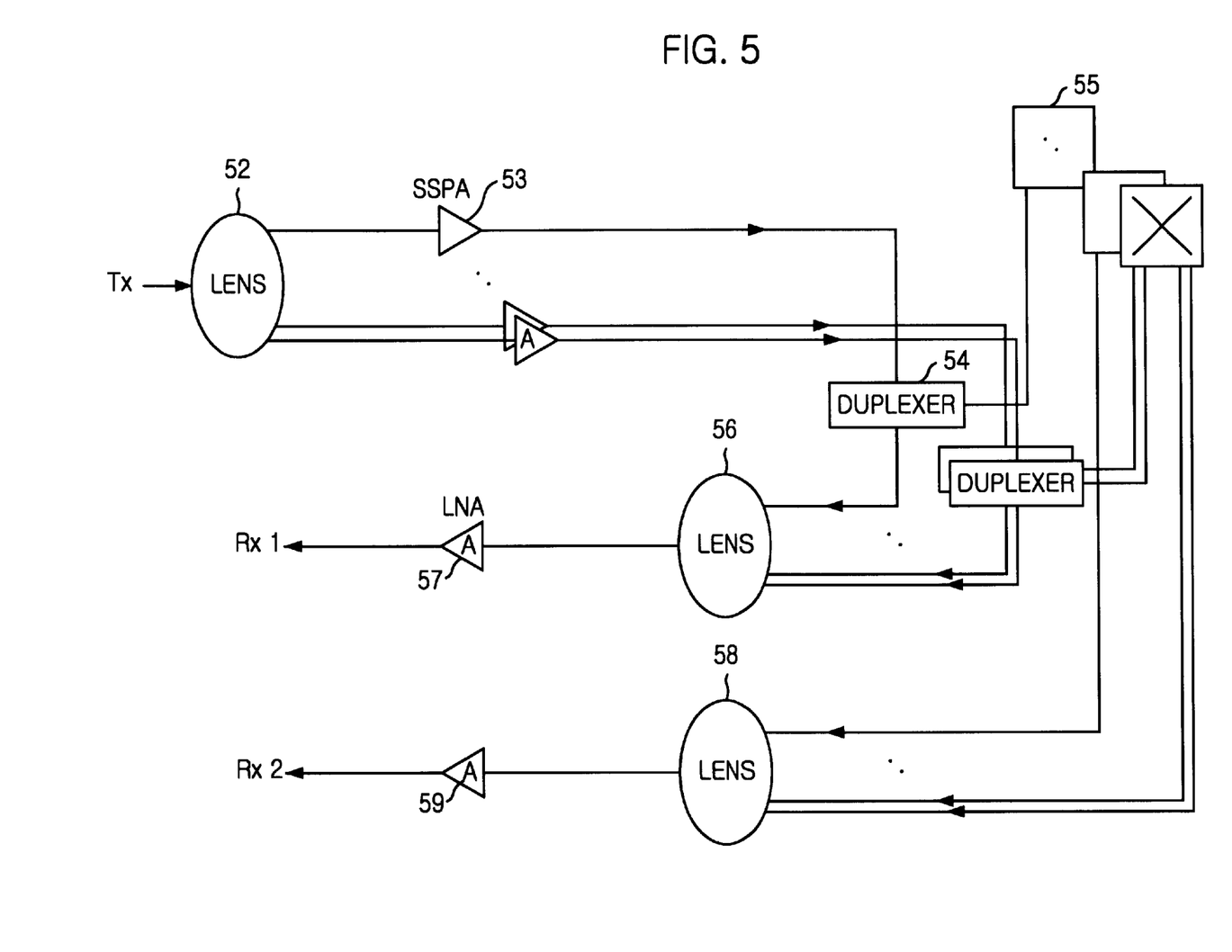
FIG. 5 is a diagram illustrating a polarization diversity phased array base station antenna system having a set of distributed low power amplifiers and duplexers in accordance with the present invention.

FIG. 5 is a diagram illustrating a polarization diversity phased array base station antenna system in accordance with the present invention. The dual polarized phased array base station antenna system comprises microwave lens 52, 56 and 58, and an array of distributed low power amplifiers 53, an array of duplexers 54, an array of dual polarized (±45°) antennas 55 and low noise amplifiers 57 and 59.

As described above referring to FIG. 3, in a forward direction, if a beam port (e.g., b3) of the microwave lens 52 is selected, an input signal at the beam port is dispersed to array ports. The dispersed signals are amplified by the distributed low power amplifiers 53, fed to one polarization set of dual polarized arrayed antenna 55 through duplexers 54 and radiated into the air. Herein, for description, it is assumed that one set of polarization arrayed antennas, the transmitting and receiving antennas, have an angle +45°.

In a reverse direction, the signals received by the same polarization array (+45°) are sent to the microwave lens 56 through the arrayed duplexers 54 and signals received by the other receiving only polarization array (−45°) are sent to the microwave lens 58.

The signals are propagated through the microwave lens 56 and 58, strengthened at an in-phased beam ports, amplified by the low noise amplifiers 57 and 59 before running trough the long lossy cables and sent to the base station.

Even though the microwave lens is used in this embodiment, other devices for forming multiple beam such as Butler matrix and solid state phase shifters can be used.

Figure 6:
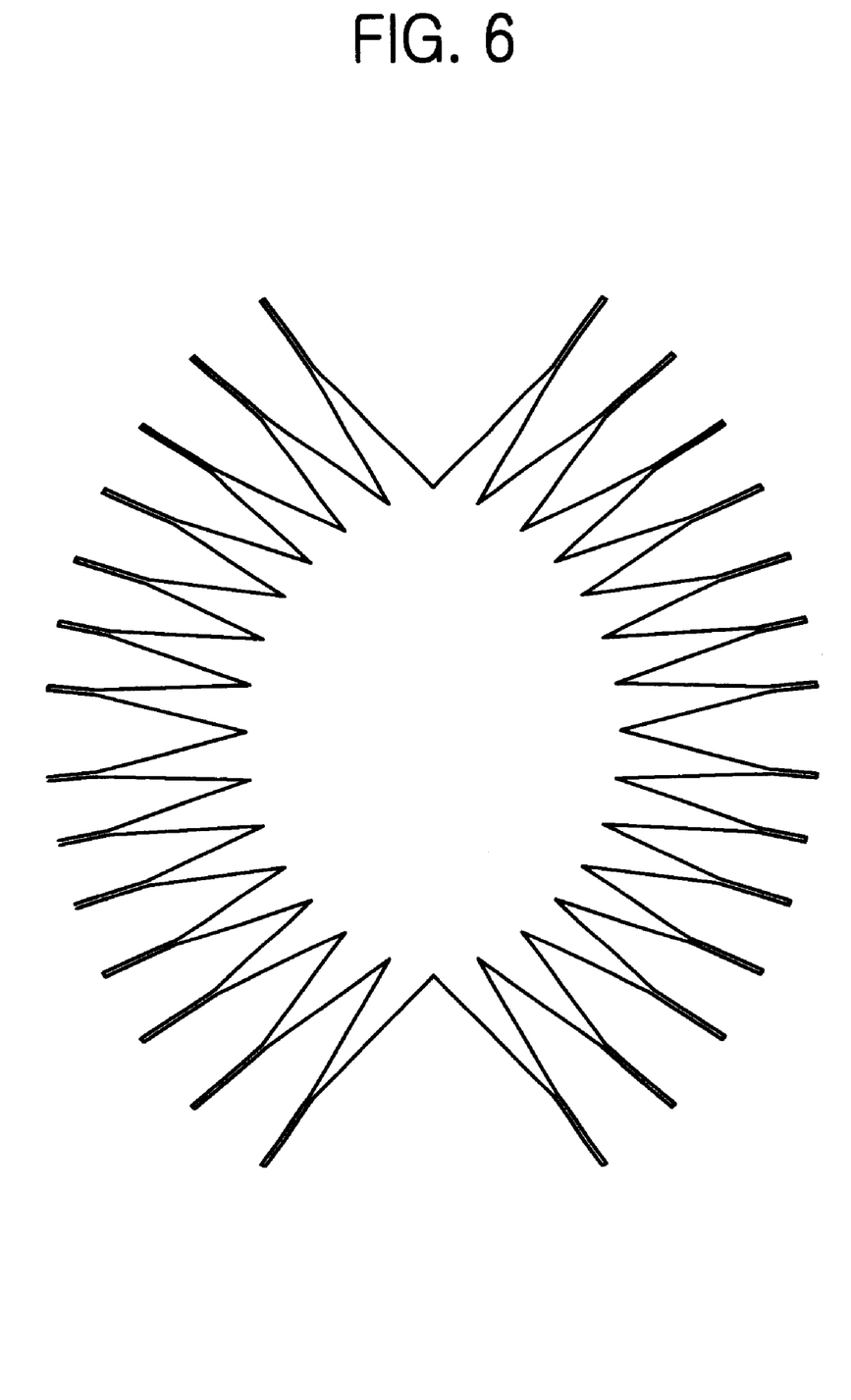
FIG. 6 is a view illustrating a high-resolution beam-steering microwave lens in accordance with an embodiment of the present invention.

FIG. 6 shows microwave lens applied to the present invention.

Referring to FIG. 6, there is an etched micro strip lens on a substrate with 50 ohm micro strip lines at each port, which is designed with 14 symmetrical 14 beam ports and array ports.

In these embodiments, only 8 beam ports in the middle of all 14 beam ports are used to give 8 steered beams spaced by almost 2.8° covering ±10° steering angles. The presented steering step size 2.8° is high resolution which may be difficult to obtain by any other phased array techniques like Butler matrix or solid state phase shifters. The remained 6 beam ports both sides may be used to extend coverage up to ±14°. The 8 array ports in the middle of all 14 array ports are used to feed 8 distributed amplifiers and antennas, and the remained 6 array ports in both sides of the microwave lens are reserved to provide much effective radiated power. Since the microwave lens is a passive element, the lens has no directivity. Thereby, a transmitting microwave lens can be used as a receiving one, and vice versa.

Figure 7:
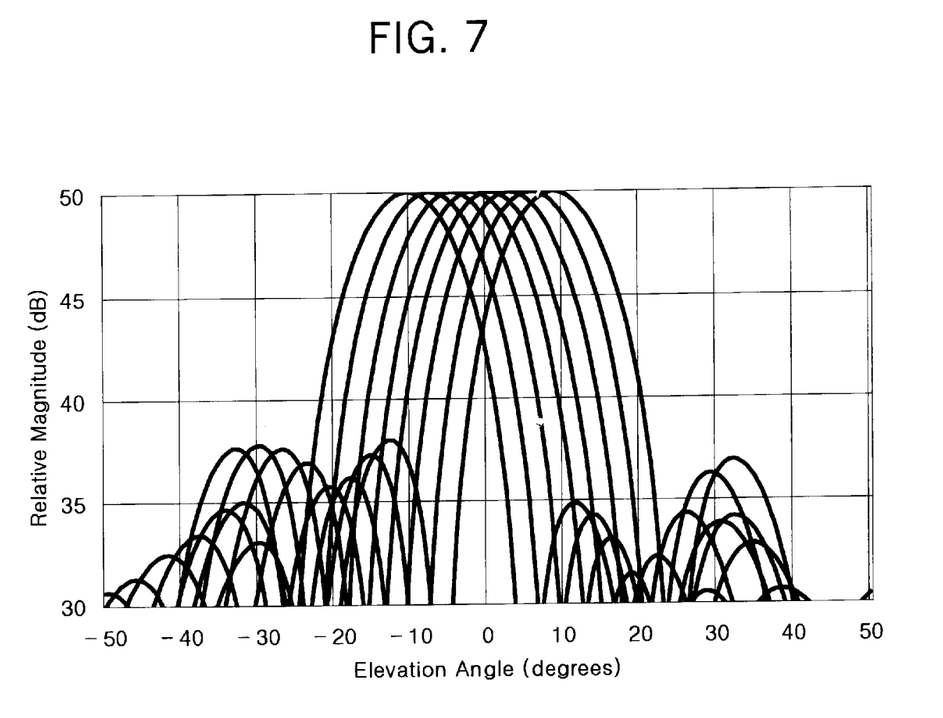
FIG. 7 is a view demonstrating the beam steered radiation patterns in accordance with the present invention.

FIG. 7 shows beam steered radiation patterns measured from a transmitting phased array antenna system as described referring to FIG. 3.

Here, it is important that in order to preserve the phase control of the microwave lens, the distributed elements such as the low power amplifiers and the duplexers should be well matched in magnitude and phase transfer from channel to channel. The horizontal axis is observation angle in elevation direction and the vertical axis is the radiation field intensity. As expected, there are shown 8 steered beams within ±10° spaced by almost 2.8°.

The antenna system of the present invention uses neither expensive high power amplifiers nor several tens meters radio frequency cables. Therefore, using the antenna system of the present invention can considerably save costs for establishment and maintenance of the antenna system.

A low power amplifier used in the present invention is more effective as well as smaller and cheaper than the conventional single high power amplifier. The low power amplifier saves prime power enough to operate without heavy cooling system. Also, the life span of the low power amplifier is longer than that of the high power amplifier used in the prior art, because the low power amplifier is more reliable.

Even if one or two of the distributed amplifiers in the base station antenna system in accordance with the present invention get out of order, only a few dB of effective radiation power decrease, thereby preventing a sudden break in communication service and being possible to obtain time for maintenance. On the contrary, the trouble in the conventional high power amplifier means an absolute shut-down of the communication service.

In the present invention, the radiation beam is not fixed as in the prior art but can be electrically changed by the wireless command sent from a remote place and can be promptly checked and re-treated by the measurement of the electric field intensity at the remote place far away from the base station. There needs no crew who is delegated and climbed up to the antenna tower to adjust the mechanical bracket, saving maintenance cost and preventing an accident.

Using the present invention, the reverse direction signals are combined at an in-phased beam port of the lens and amplified by the low noise amplifier before the lossy several tens meter feed cable. It considerably enhances the reverse direction communication quality.

Although the preferred embodiments of the invention have been disclosed for illustrative purpose, those skilled in the art will appreciate that various modifications, additions and substitutions are possible, without departing from the scope and spirit of the invention as disclosed in accompanying claims.

What is claimed is:

1. A polarization diversity phased array base station antenna system, comprising:

a phased array means for selecting an input signal through one of a plurality of beam ports, for dividing the input signal into a plurality of signals and for outputting the plurality of signals through a plurality of array ports, each signal of the plurality of signals having a linear phase difference according to a difference of propagation path length;

a first switching means for receiving the input signal from a base station, for selecting one of the plurality of beam ports of said phased array means and for transmitting the input signal to the selected beam port, responsive to a control signal transmitted from the base station;

a plurality of amplifying means having a predetermined amplification factor for amplifying the plurality of signals inputted from the plurality of array ports of said phased array means;

first phased array antennas for radiating the plurality of signals from said plurality of amplifying means, providing a spatial power summation in an equiphase plane direction that enables an effective radiated power to cover a cell in a steered direction selected by said first switching means, and for receiving a signal radiated from a mobile station;

phased array duplexing means for transferring signals from said plurality of amplifying means to said first phased array antennas and for receiving and outputting received signals from said first phased array antennas;

second phased array means for receiving a plurality of signals from said phased array duplexing means through a plurality of array ports, each signal, of said plurality of signals, having a linear phase difference, and for allowing the plurality of signals to be in-phase and strengthened at a beam port;

second switching means for selecting a strengthened signal responsive to the control signal transmitted from the base station;

first low noise amplifying means for low noise amplifying a selected strengthened signal and transmitting the selected strengthened signal to the base station;

second phased array antennas for receiving a signal radiated from a mobile station;

third phased array means for receiving a plurality of signals from said second phased array antennas through a plurality of array ports, each signal having a linear phase difference, and for allowing the plurality of signals to be in-phase and strengthened at a beam port;

third switching means for selecting a strengthened signal in response to the control signal transmitted from the base station; and second low noise amplifying means for low noise amplifying a selected strengthened signal and for transmitting the selected signal to the base station.

2. The antenna system of claim 1, wherein said antenna system is mounted on an antenna tower.

3. The antenna system of claim 1, wherein said phase array means comprises a microwave lens.

4. The antenna system of claim 1, wherein said phased array means comprises a Butler matrix.

5. The antenna system of claim 1, wherein said phased array means comprises a series of solid state phase shifters.

6. The antenna system of claim 1, wherein the control signal is transmitted from an interface card inside the base station, which is dialed up and commanded by a wireless modem from an operator located at a remote area.

7. A polarization diversity phased array base station antenna system, comprising:

a phased array device that selects an input signal through one of a plurality of beam ports, said phased array dividing the input signal into a plurality of signals, said plurality of signals being output through a plurality of array ports, each signal of said plurality of signals having a linear phase difference in accordance with a propagation path length difference;

a first switching device that receives said input signal from a base station, a beam port of said plurality of beam ports being selected by said first switching device in response to a control signal transmitted from the base station, so that the input signal is transmitted to said selected beam port;

a plurality of amplifiers that have a predetermined amplification factor to amplify said plurality of signals inputted from said plurality of array ports of said phased array device;

first phased array antennas that radiate said plurality of signals amplified by said plurality of amplifiers, providing a spatial power summation in an equiphase plane direction that enables an effective radiated power to cover a cell in a steered direction selected by said first switching device, and for receiving a signal radiated from a mobile station;

a phased array duplexing device that transfers signals from said plurality of amplifiers to said first phased array antennas and for receiving and outputting received signals from said first phased array antennas;

a second phased array device that receives a plurality of signals from said phased array duplexing device through a plurality of array ports, each signal, of said plurality of signals, having a linear phase difference, and for allowing the plurality of signals to be in-phase and strengthened at a beam port;

a second switching device that selects a strengthened signal responsive to the control signal transmitted from the base station;

a first low noise amplifier that low noise amplifies a selected strengthened signal, said selected strengthened signal being transmitted to the base station;

second phased array antennas that receive a signal radiated from a mobile station;

a third phased array device that receives a plurality of signals from said second phased array antennas through a plurality of associated array ports, each signal having a linear phase difference, and for allowing the plurality of signals to be in-phase and strengthened at a beam port;

a third switching device that selects a strengthened signal in response to the control signal transmitted from the base station; and a second low noise amplifier that low noise amplifies a selected strengthened signal and for transmitting the selected signal to the base station.

8. The antenna system of claim 7, wherein said antenna system is mounted to a fixed structure.

9. The antenna system of claim 8, wherein said fixed structure comprises an antenna tower.

10. The antenna system of claim 7, wherein said phased array device comprises one of a microwave lens, a Butler matrix, and a phase shifter.

* * * * *